United States Patent [19]

Grant et al.

[11] 4,216,505
[45] Aug. 5, 1980

[54] TRANSDUCER HEAD VIBRATION DAMPENING

[75] Inventors: Frederic F. Grant, Bellflower; Henry M. Martija, La Verne, both of Calif.

[73] Assignee: Bell & Howell Company, Chicago, Ill.

[21] Appl. No.: 966,676

[22] Filed: Dec. 5, 1978

[51] Int. Cl.² .......................... G11B 21/16; G11B 5/48
[52] U.S. Cl. .................................... 360/104; 248/636
[58] Field of Search ................. 360/104; 248/636, 638

[56] References Cited

U.S. PATENT DOCUMENTS

| | | | |
|---|---|---|---|
| 3,326,440 | 6/1967 | Barnes et al. | 360/104 |
| 4,017,898 | 4/1977 | Toombs et al. | 360/104 |

Primary Examiner—Robert S. Tupper
Attorney, Agent, or Firm—Benoit Law Corporation

[57] ABSTRACT

A metallic mass is placed into frictional engagement with a transducer head structure. Vibrations of such transducer head structure are dampened by relative displacement between the metallic mass and frictionally engaged transducer head structure. Plastic deformation of the metallic mass frictionally engaging the transducer head structure may also be employed to dampen vibrations. The metallic mass may be pressed into frictional engagement with the transducer head structure, and vibrations from the frictionally engaged transducer head structure may be transmitted through the metallic mass to the viscoelastic polymeric layer to set up shearing strains in that layer causing the mass to dampen vibrations of the transducer head structure by lagging oscillation in frictional engagement with that transducer head structure.

29 Claims, 6 Drawing Figures

4,216,505

TRANSDUCER HEAD VIBRATION DAMPENING

BACKGROUND OF THE INVENTION

1. Field of the Invention

The subject invention relates to vibration dampening methods and apparatus and, more specifically, to dampening vibrations of transducer heads. By way of example, the subject invention may be employed to dampen vibrations of magnetic recording and/or playback heads in magnetic tape transports.

2. Prior-Art Statement

A classical vibration damping technique applies an elastomeric layer between the vibrating member and a supporting structure or base plate, as may, for instance, be seen from U.S. Pat. No. 3,326,440, by C. A. Barnes et al. Since the elastomeric layer in that type of damping structure, to be fully effective, would have to be of the order of magnitude of the vibration amplitude, it is very difficult and frequently impossible to dampen extremely small vibrations with that method. Similar considerations apply to the vibration damping system disclosed in U.S. Pat. No. 3,769,467, by A. Gabor, which proposes employment of an energy absorbing material of the type which becomes lossier as the rapidity of the deforming impulse acting on the absorbing material increases. According to the vibration dampening technique disclosed in the latter patent, a layer of that energy absorbing material is interposed between a transducer head structure and an overhanging mass of relatively dense material. The chief purpose of such prior-art system is to dampen significant movement or vibration caused by high acceleration and deceleration forces.

A direct application of elastomeric, fibrous or similar acoustic damping members to active transducer parts is apparent from U.S. Pat. No. 3,654,402, by J. Roos, and U.S. Pat. No. 3,930,560, by E. V. Carlson et al. Again, small vibrations would be difficult to dampen in this manner, particularly if acoustic vibrations pertaining to the operation of the transducer are to be preserved.

U.S. Pat. No. 2,783,311, by R. Scott, on the other hand, employs a damping liquid to restrict rocking motion of recording and reproducing heads. In practice, it would be difficult and cumbersome to provide and maintain a liquid damping material in a magnetic tape transport and to effectively dampen vibrations in this manner.

For completeness' sake, reference is also made to U.S. Pat. No. 3,311,711, by M. B. Maryatt et al, showing a resilient core holder for pressing head sections into alignment, and U.S. Pat. No. 3,767,209, by E. Seehawer, employing springs to force a transducer head into its proper location against fitting markers.

SUMMARY OF THE INVENTION

It is a general object of this invention to overcome the disadvantages and satisfy the needs implicit in the above prior-art statement.

It is a related object of this invention to provide improved vibration dampening methods and apparatus.

It is a germane object of this invention to provide improved methods and apparatus for dampening vibrations of transducer head structures.

It is a related object of this invention to provide for a dampening of extremely small vibrations, such as those in the sub-millionth of an inch or centimer range.

It is also an object of this invention to provide improved information recording and playback systems.

It is a similar object of this invention to provide improved magnetic tape transports.

Other objects will become apparent in the further course of this disclosure.

From one aspect thereof, the subject invention resides in a method of dampening vibrations of a transducer head structure, comprising in combination the steps of providing a metallic mass, frictionally engaging the transducer head structure with such metallic mass, and dampening vibrations of the transducer head structure by relative displacement between the mass and frictionally engaged transducer head.

From another aspect thereof, the subject invention resides in a method of dampening vibrations of a transducer head structure, comprising in combination the steps of providing a metallic mass, providing a viscoelastic polymeric layer for pressing such mass into frictional engagement with the transducer head structure, and transmitting vibrations from the frictionally engaged transducer head structure through the mass to the layer to set up shearing strains in the layer causing the mass to dampen vibrations of the transducer head structure by lagging oscillation in frictional engagement with the transducer head structure.

From another aspect thereof, the subject invention resides in a method of dampening vibrations of a transducer head structure, comprising in combination the steps of providing a metallic mass subject to plastic deformation in response to vibrations of the transducer head structure, frictionally engaging the transducer head structure with such metallic mass, and dampening vibrations of the transducer head structure by relative displacement between the mass and frictionally engaged transducer head structure and plastic deformation of the mass frictionally engaging the transducer head structure.

From another aspect thereof, the subject invention resides in a method of dampening vibrations of a transducer head structure, comprising in combination the steps of providing a metallic mass subject to plastic deformation in response to vibrations of the transducer head structure, providing a viscoelastic polymeric layer for pressing such mass into frictional engagement with the transducer head structure, and transmitting vibrations from the transducer head structure through the mass to the layer to set up shearing strains in the layer causing the mass to dampen vibrations of the transducer head structure by lagging oscillation in frictional engagement with the transducer head structure and plastic deformation of the mass frictionally engaging the transducer head structure.

From another aspect thereof, the subject invention resides in apparatus for dampening vibrations of a transducer head structure, comprising, in combination, a metallic mass in frictional engagement with the transducer head structure, and means coupled to such metallic mass for dampening vibrations of the transducer head structure by relative displacement between such mass and frictionally engaged transducer head structure.

From another aspect thereof, the subject invention resides in apparatus for dampening vibrations of a transducer head structure, comprising, in combination, a metallic mass, and means including a viscoelastic polymeric layer for pressing such mass into frictional engagement with the transducer head structure to set up shearing strains in the layer with vibrations transmitted from the frictionally engaged transducer head structure through such mass to the layer to dampen vibrations of the transducer head structure by lagging oscillation in frictional engagement with the transducer head.

From another aspect thereof, the subject invention resides in apparatus for dampening vibrations of a transducer head structure, comprising, in combination, a metallic mass subject to plastic deformation in response to vibrations of the transducer head structure, and means coupled to such metallic mass for effecting relative displacement between such mass and frictionally engaged transducer head structure and plastic deformation of such mass frictionally engaging the transducer head structure in response to the vibrations.

From another aspect thereof, the subject invention resides in apparatus for dampening vibrations of a transducer head structure, comprising, in combination, a metallic mass subject to plastic deformation in response to vibrations of the transducer head structure, and means including a viscoelastic polymeric layer for pressing such mass into frictional engagement with the transducer head structure to set up shearing strains in the layer with vibrations transmitted from the frictionally engaged transducer head structure through such mass to the layer to dampen vibrations of the transducer head structure by lagging oscillation in frictional engagement with the transducer head structure and plastic deformation of such mass frictionally engaging the transducer head structure.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 4 is a section taken along the line 4—4 in FIG. 2;

FIG. 5 is a view similar to FIG. 4 showing a modification in accordance with a further embodiment of the subject invention.

DESCRIPTION OF PREFERRED EMBODIMENTS

The transducer head structure 10 as shown in FIGS. 1 to 4 implements the advanced features disclosed and claimed in copending U.S. patent application Ser. No. 939,533, filed Sept. 5, 1978, by William C. Whittle, assigned to the subject assignee, and herewith incorporated by reference herein. While the subject invention is, of course, not restricted in its utility to any particular transducer head structure, its subject description and showing in the context of the mentioned Whittle structure not only serves to elucidate the features, advantages and utility of the subject invention against the background of an already highly advanced transducer head structure, but also presents the best mode presently contemplated by the inventors of carrying out their subject invention.

The transducer head structure 10 includes a pair of transducer head 12 and 13. By way of example, these transducer heads may form part of magnetic tape recording and playback equipment. By way of further example, such equipment may include a magnetic tape transport having a precision plate, part of which is seen at 14 in FIGS. 1 and 2.

Figure 1:
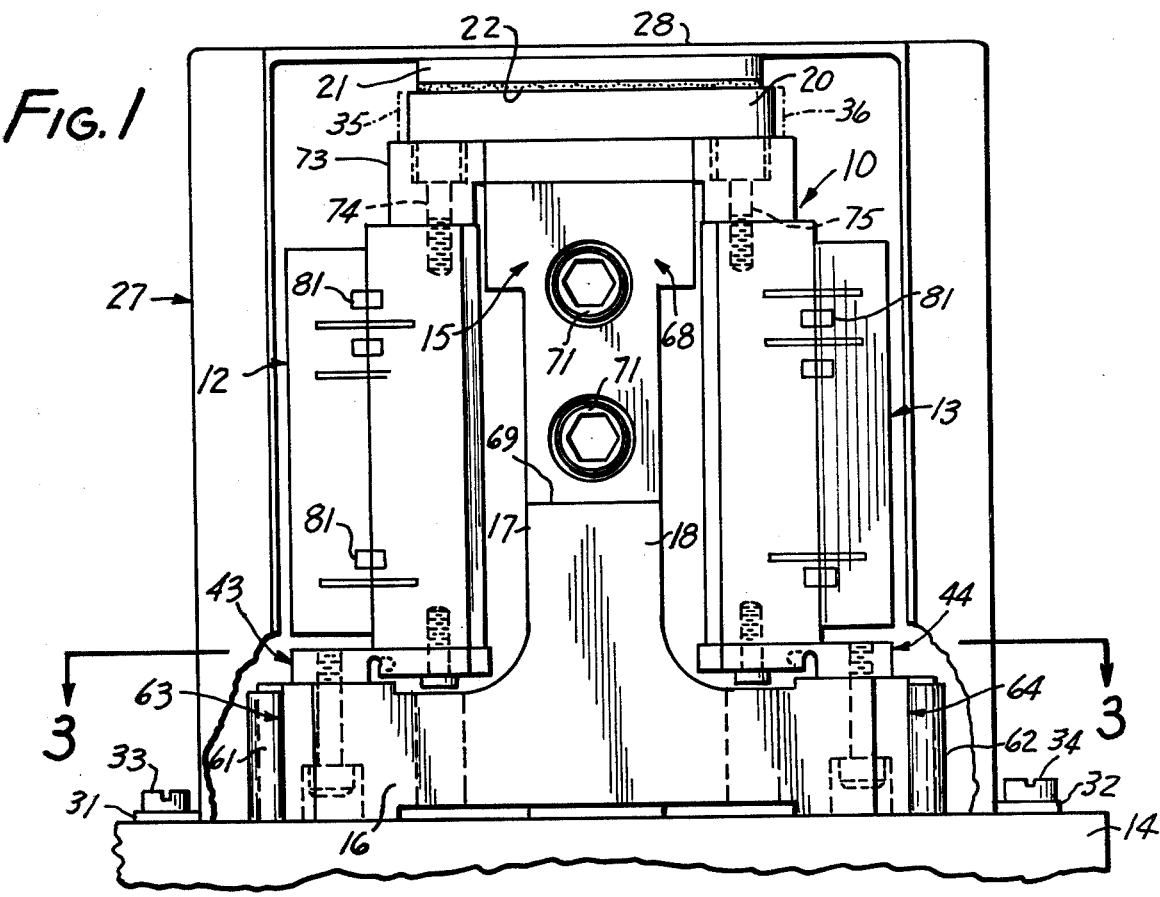
FIG. 1 is an elevation of a magnetic recording head assembly employing a vibration dampening structure in accordance with a preferred embodiment of the subject invention.

The transducer head structure includes a mount 15 for the transducer heads 12 and 13. This mount 15 has a base 16 and integral riser beam 17 jointly forming a rigid inverted T-shaped structure 18, as best seen in FIG. 1. In such first T-shaped structure 18, the riser beam 17 rises perpendicularly from or extends perpendicularly to a midportion of the base 16.

The mounting structure so far described is able to support the transducer heads 12 and 13 on opposite sides of the riser beam 17 at a high stiffness relative to its mass or weight. By way of example, the mounting structure may be formed of a light weight metal, such as aluminum or an aluminum alloy, shaped by casting or molding, for instance.

Because of its high stiffness, the illustrated transducer head structure 10 is not subject to most of the vibrational effects that have beset prior-art head structures. In particular, the high stiffness and rigidity of the illustrated transducer head structure 10 effectively prevents the occurrence of large amplitude vibrations in the operation of the transducer heads 12 and 13. In this manner, the illustrated structure 10 solves the type of problem which the prior-art attempted to overcome with the above mentioned vibration absorbing elastomeric layer positioned in contact with the head structure between such structure and a supporting member or mount. Also, in contrast to such prior-art attempts, the illustrated head structure 10 solves these problems by precluding an occurrence of large amplitude vibrations in the first place, thereby effectively treating the cause of the problem, rather than its symptoms.

However, even with the stiffest and most rigid transducer head structure, vibrations of extremely small amplitude, often below a millionth of an inch or centimeter, occur in practice. As the performance of information transducing and recording systems is pushed to higher and higher achievements, even such extremely small vibrations more and more show up in the transduced or reproduced signal as noticeable disturbances, leading to flutter-like effects, time base errors and other artifacts.

In practice, there usually are several sources for the small vibrations under consideration, rendering their elimination at the source practically impossible. A particularly troublesome source of low amplitude head vibration is stick-slip friction between the tape or other information recording medium and the engaging transducer head. Especially tapes or other recording media moving in contact with the transducer head at low speeds tend to move in a jerky motion, due to the fact true with most materials that the static coefficient of friction $\mu_s$ is larger than the dynamic coefficient of friction $\mu_d$. Stick-slip friction not only excites resonance effects at transducer heads, but also at tape capstans and guides, thereby affecting the signal transducing or reproducing operation with flutter effects. Moreover, practical servo systems are unable to cope with the type of vibrations presently under consideration, inasmuch as such vibrations are either too low in amplitude for effective servo action or then have frequencies outside a feasible servo bandwidth.

The subject invention overcomes these and similar problems by providing a metallic mass 20, frictionally engaging the transducer head structure 10 with that metallic mass and dampening vibrations of the transducer head structure by relative displacement between the mass 20 and frictionally engaged transducer head structure 10. In accordance with a preferred embodiment of the subject invention, a viscoelastic polymeric layer 21 is provided for pressing the mass 20 into frictional engagement with the transducer head structure 10.

Vibrations are transmitted from the frictionally engaged transducer head structure through the mass 20 to the layer 21 to set up shearing strains in that layer 21, causing the mass 20 to dampen vibrations of the transducer head structure by lagging oscillation in frictional engagement with the transducer head structure 10.

Figure 6:
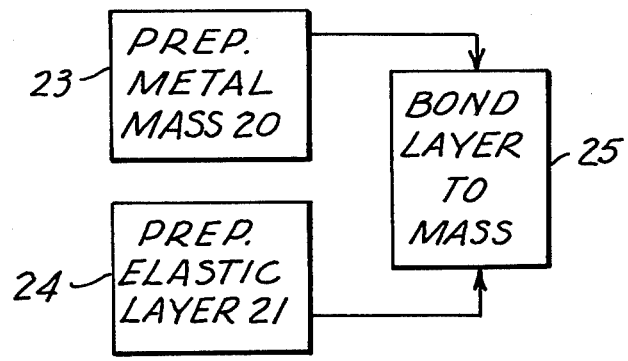
FIG. 6 is a flowsheet illustrating a method according to a preferred embodiment of the subject invention.

According to the flow diagram of FIG. 6, the metallic mass 20 prepared at 23 and the elastic layer 21 prepared at 24 may be bonded to each other, as indicated at 25. For instance, the polymeric layer 21 may be bonded to the metallic mass 20 with an adhesive 22 or by another conventional bonding technique that will assure transmission of transducer head vibrations from the mass 20 to the layer 21.

On the other hand, the metallic mass 20 is not bonded to the transducer head structure, but, to the contrary is only in frictional engagement with the transducer head structure 10. In this manner, the mass 20 is capable of performing a dampening function that was neither performable by prior-art techniques which directly attached or bonded a mass or weight to a transducer head or similar structure, nor by prior-art methods which interposed an elastomeric layer between a mass and the transducer head or other structure or which otherwise applied an elastomeric layer or similar sound absorbing material directly to a transducer head or similar structure subject to vibrations to be dampened.

Also in accordance with a preferred embodiment of the subject invention, the provided mass 20 is subject to plastic deformation in response to vibrations of the transducer head structure. In that case, vibrations are not only dampened by relative displacement between the mass 20 and frictionally engaged transducer head structure, but also by plastic deformation of the mass 20 frictionally engaging the transducer head structure 10. In practice, this subjects transducer head vibrations to a double-barrel attack for greater efficiency and effectiveness of the dampening process.

In this respect, plastic deformation is distinguished from Hookean elasticity according to well-known principles relating to mechanical properties of materials. For instance, elastic deformation according to Hooke's law is said to occur if a piece of metal stretches under an applied stress, but returns to its original shape when the stress is removed. In contrast to this Hookean elasticity, the type of plastic deformation here of interest as to the mass 20 occurs when an external stress exceeds the yield strength of the particular material. The yield strength of a material is exceeded when the material under stress exhibits deviation from proportionality of stress and strain. Thus, yield stress is the stress at which plastic deformation sets in. In practice, it is customary to express yield strength in terms of a specified deviation, such as a few per mill, from proportionality of stress and strain.

For instance, lead has an 0.5% offset yield strength on the order of 50 to 60 kg/cm$^2$ if sandcast and 80 to 100 kg/cm$^2$ after rolling.

According to a preferred embodiment of the subject invention, the metallic mass 20 has a yield strength of less than 150 km/cm$^2$. In this manner, plastic deformation of the mass 20 can be taken advantage of in dampening vibrations of the frictionally engaged transducer head structure.

In testing the subject invention on a prototype of the illustrated transducer head structure, best results so far have been obtained with an alloy containing, in percent by weight, 50% bismuth, 26.7% lead, 13.3% tin and 10% cadmium. That alloy has a specific weight or density of 9.37 g/cm$^3$, and a sustained yield strength of 21 kg/cm$^2$. By way of comparison, tin has a density 7.3 g/cm$^3$ and a yield strength between 70 and 105 kg/cm$^2$.

By way of contrast, copper may have a yield strength in the 3500 kg/cm$^2$ area. Aluminum has a yield strength of about 1000 kg/cm$^2$ when cold rolled. Through annealing, the yield strength of aluminum may, however, be reduced to about 120 kg/cm$^2$, for instance.

However, the low density of aluminum, on the order of 2.7 g/cm$^3$, generally makes it a poor material for damping mass purposes. According to a preferred embodiment of the subject invention, the density of the metallic mass 20 is at least 7 g/cm$^3$.

According to a preferred embodiment of the subject invention, the mass 20 is made of a material selected from the group consisting of bismuth, lead, tin, lead alloys, bismuth alloys and tin alloys.

Pursuant to the above mentioned principles, these materials preferably have a yield strength of less than 150 kg/cm$^2$. If desired, the properties herein required for the mass 20 may be obtained not only by alloying, but also by sintering or otherwise combining two or more suitable materials. For instance, copper, cadmium or cobalt particles may be incorporated into lead or tin by sintering, and the resulting mass may then be used at 20. The block 23 in FIG. 6 is thus intended to designate provision of a more or less pure material, as well as of alloying, sintering or other materials combining steps. The block 23 in practice also would include the shaping of the mass 20 by casting, cutting, machining or other forming techniques.

As mentioned above, the layer 21 comprises a viscoelastic polymer. As is well known, application of stress on a polymer system above the glass transition temperature results in short range orientation effects of portions of the polymer molecules. Due to molecular chain entanglements acting as physical crosslinks, the structure of the polymer returns to its original condition upon removal of the stress. This property is referred to as visco elasticity, and is similar to the behavior of rubbery materials.

In accordance with a preferred embodiment of the subject invention, the layer 21 is an elastomer layer. In the context of this embodiment, the term "elastomer" is intended to refer not only to a rubberlike synthetic polymer, but also to natural rubber. The block 24 in FIG. 6 may thus symbolize the preparation and casting or shaping of a natural rubber layer, as well as the preparation and casting or shaping of a synthetic elastomeric polymer layer.

In addition to preferably soft rubber, suitable elastomers for the layer 21 include silicon rubber, a styrenebutadiene thermoplastic elastomer and polyurethane elastomers displaying the extensibility and elasticity of rubber.

Figure 2:
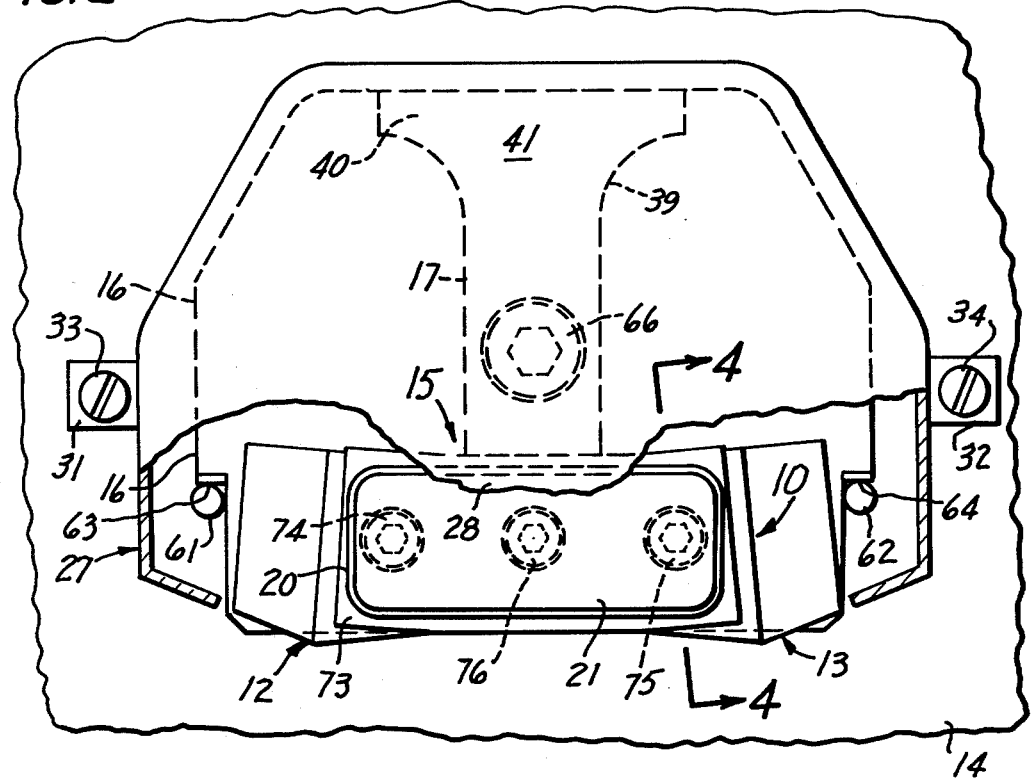
FIG. 2 is a top view, partially in fraction, of the assembly of FIG. 1.
Figure 3:
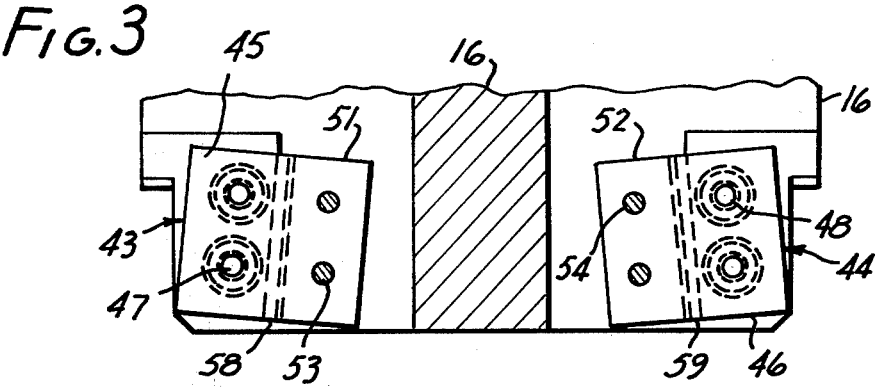
FIG. 3 is a section taken along the line 3—3 in FIG. 1.

As seen in FIGS. 1 and 2, the transducer head assembly has a housing or shielding structure 27 which includes a plate section 28 for pressing the visco-elastic layer 21 towards the mass 20. To this end, the shield structure 27 has lateral lugs 31 and 32 for receiving fasteners or screws 33 and 34 for attaching the shield structure to the base plate 14, so as to press the mass 20 via viscoelastic layer 21 into frictional engagement with the transducer head structure 10.

As indicated in FIG. 1 in a somewhat exaggerated manner by dotted lines 35 and 36, the mass 20 will plastically deform itself in response to vibrations of the transducer head structure, and will even displace itself relative to that transducer head structure while in frictional engagement therewith, thereby dampening transducer head vibrations. In the illustrated preferred embodiment, the above mentioned shearing strains in the viscoelastic layer 21 cause the metallic mass 20 to lag in its oscillations relative to the vibrating head structure 10, thereby absorbing vibrational energy therefrom.

Details of the transducer structure 10 may now be considered with the aid of FIGS. 1 to 5. In particular, the transducer structure 10 has a first T-shaped profile, namely the profile of the inverted T-shaped structure 18, and a second T-shaped profile 39 (see FIG. 2) extending at right angles to the first T-shaped profile. The transducer heads 12 and 13 are mounted in spaced relationship on the supporting structure at the first and second T-shaped profiles.

In particular, the structure 10 specifically shown in the drawings includes the above mentioned base 16, a stiffening rib 40 extending perpendicularly to that base, and the above mentioned riser beam 17 integral with the base 16 and stiffening rib 40. The riser beam 17 extends perpendicularly to the midportion of the base 16 and perpendicularly to a midportion 41 of the stiffening rib 40. The riser beam 17 is thus common to, and forms part of, both the first and second T-shaped profiles 18 and 30. As seen, the transducer heads 12 and 13 are mounted on opposite sides of the riser beam 17.

In particular, the specifically illustrated structure 10 includes a flexible beam 43 and a flexible beam 44. Each beam has a stationary portion 45 and 46 connected or attached to the base 16 by fasteners or screws 47 and 48, respectively. Each flexible beam 43 and 44 also has a tongue 51 and 52 attached to one end, namely the lower end, of the corresponding transducer head 12 or 13 by fasteners or screws 53 or 54. Bores in the mounting structure base 16 permit access to the screws 53 and 54.

Each of the beams 43 and 44 has a reduced thickness portion 58 and 59, respectively, for enhancing the flexibility of the beams. The transducer heads 12 and 13 are thus tiltably supported on the base 16.

In practice, the illustrated construction employing the flexible beams 43 and 44 for tiltably supporting the transducer heads 12 and 13 at their lower ends at the base 16, is far superior in attainable mounting precision and azimuth adjustability to prior-art proposals which simply support the transducer heads at their lower ends with an elastomeric pad. In particular, the flexible supporting beams afford a more definite support and a more predictable location of flexure, and a better vibration control, than an elastomeric pad into which the lower end of each transducer head is pressed.

Further vibration control is obtained by mounting the transducer head structure with the aid of two spaced mounting pins 61 and 62 attached and extending perpendicularly to the precision plate 14. The base 16 has notches 63 and 64 spaced to receive the mounting pins 61 and 62 in abutment with the base 16. Means at the base 16 for attaching the base to the precision plate 14 include the bolt 66 extending through an aperture 51 in the base, with that aperture being spaced from the notches 63 and 64. This mounting technique avoids both the type of sticking and the type of slopping customarily encountered with pin-recipient holes. In this manner, vibration-causing tolerance requirements are removed from the mounting hole of the attachment holt 66 which may simply be threaded into a tapped hole (not shown) in the precision plate 14.

The transducer head structure 10 includes a further T-shaped structure 68 connected to the riser beam 17 in spaced relationship to the base 16 for coupling corresponding upper ends of the transducer heads 12 and 13 to the riser beam 17. To this end, the riser beam 17 has a notch delimited by a vertical surface and a horizontal surface 69 for receiving the third T-shaped structure 68. Screws 71 attach that structure to the riser beam, interconnecting the three T-shaped structures 18, 39 and 68 into a stiff and rigid transducer head mounting unit.

The third T-shaped structure 68 includes or supports a beam 73 for mounting each transducer head relative to the riser beam 17. By way of example, and as shown in FIGS. 1 and 2, the mounting beam 73 has end portions attached to the upper ends of the transducer heads 12 and 13 by screws 74 and 75, respectively. The central portion of the mounting beam 73 is attached to the upper portion of the third T-shaped structure 68 by at least one screw 76 shown in FIGS. 2 and 4. In practice, more than one screw or other fasteners may be employed to attach the mounting beam 73 to the riser 17 or structure 68, or such mounting beam in effect may be integral with the riser 17 or structure 68.

As seen from FIGS. 1 to 4, the metallic mass 20 frictionally engages the transducer head mounting beam 73 in the illustrated preferred embodiment. This, of course, is within the scope of the subject invention which requires frictional engagement of the metallic mass 20 with the tranducer head structure 10, of which the head mounting beam 73 is a part.

This principle also applies to the modification in accordance with a further embodiment shown in FIG. 5, according to which a hole or cavity 78 is provided in the metallic mass 20, in order to accommodate the head of a screw 76 which protrudes above a head mounting beam 73' that is similar or identical to the mounting head 73, but does not have a counterbore for accommodating the head of the particular screw.

In this manner, the mass 20 still frictionally engages the head mounting beam 73' and thus the transducer head structure. The illustrated embodiments thus provide for dampening of vibrations of the transducer head structure by relative displacement (see 35, 36) between the mass 20 and frictionally engaged mounting beams 73 or 73'. The bore 78 in the mass 20 preferably is larger than the screw head, to permit the mass 20 to oscillate relative to the mount 73'. The remainder of the structure shown in FIG. 5, including the viscoelastic layer 21 and the pressing plate 28, is the same in nature and function as in FIGS. 1 to 4. If desired, the heads of the transducer mounting screws 74 and 75 may also be accommodated in holes or cavities of the metallic mass 20, similar to the cavity 78.

As disclosed in the above mentioned copending Whittle patent application incorporated by reference herein, the third T-shaped structure 68 may support mechanism for selectively tilting each transducer head relative to the riser beam 17. In this respect, angular adjustments into and out of the plane of the magnetic recording tape running past the transducers 12 and 13, that is angular adjustments relative to the plane on which FIG. 1 is drawn, are generally referred to as tilt adjustments. On the other hand, angular adjustments of the transducer heads in the plane of the tape, that is angular adjustments relative to the plane on which FIG. 4 is drawn, are generally referred to as azimuth adjustments.

Moreover, the broad expression "tilting" and terminology of like import is herein intended to cover generically azimuth and tilt adjustments as well as other angular position variations of the transducer heads. In practice, azimuth adjustment or similar tilting means are primarily employed if the heads 12 and 13 are magnetic reproduce heads. Practical tests on prototypes have confirmed that the vibration dampening system of the subject invention is effective to dampen not only vibration of recording heads, but also of reproduce heads equipped with azimuth adjustment or tilting mechanisms. The subject invention and its implementations thus avoid vibrations which could disturb azimuth or other tilt adjustments, thereby disturbing the operation of the information reproducing process.

This is particularly important in the case of multichannel transducing heads, wherein several head elements 81 are distributed along the transducer head to operate in several recording channels or tracks on the tape, typically at the same time.

The subject invention thus meets all of its initially stated or implied objects and provides vibration damping techniques and information transducing equipment that presents another major advance in the information recording and playback art in particular and the transducing field in general, by effectively dampening very small vibrations.

The subject extensive disclosure will suggest or render apparent various modifications and variations within the spirit and scope of the subject invention to those skilled in the art.

We claim:

1. A method of dampening vibrations of a transducer head structure, comprising in combination the steps of:
   providing a metallic mass;
   frictionally engaging said transducer head structure with said metallic mass; and
   dampening vibrations of said transducer head structure by relative displacement between said mass and frictionally engaged transducer head structure.

2. A method of dampening vibrations of a transducer head structure, comprising in combination the steps of:
   providing a metallic mass;
   providing a viscoelastic polymeric layer pressing said mass into frictional engagement with said transducer head structure; and
   transmitting vibrations from said frictionally engaged transducer head structure through said mass to said layer to set up shearing strains in said layer causing said mass to dampen vibrations of said transducer head structure by lagging oscillation in frictional engagement with said transducer head structure.

3. A method as claimed in claim 2, wherein:
   said layer is made of an elastomer.

4. A method as claimed in claim 2, including the step of:
   bonding said layer to said mass.

5. A method of dampening vibrations of a transducer head structure, comprising in combination the steps of:
   providing a metallic mass subject to plastic deformation in response to vibrations of said transducer head structure;
   frictionally engaging said transducer head structure with said metallic mass; and
   dampening vibrations of said transducer head structure by relative displacement between said mass and frictionally engaged transducer head structure and plastic deformation of said mass frictionally engaging said transducer head structure.

6. A method of dampening vibrations of a transducer head structure, comprising in combination the steps of:
   providing a metallic mass subject to plastic deformation in response to vibrations of said transducer head structure;
   providing a viscoelastic polymeric layer pressing said mass into frictional engagement with said transducer head structure; and
   transmitting vibrations from said transducer head structure through said mass to said layer to set up shearing strains in said layer causing said mass to dampen vibrations of said transducer head structure by lagging oscillation in frictional engagement with said transducer head structure and plastic deformation of said mass frictionally engaging said transducer head structure.

7. A method as claimed in claim 6, wherein:
   said layer is made of an elastomer.

8. A method as claimed in claim 6, including the step of:
   bonding said layer to said mass.

9. A method as claimed in claim 1, 2, 3, 4, 5, 6, 7 or 8, wherein:
   said metallic mass has a yield strength of less than 150 kg/cm$^2$.

10. A method as claimed in claim 1, 2, 3, 4, 5, 6, 7 or 8, wherein said metallic mass has a density of at least 7 g/cm$^3$.

11. A method as claimed in claim 10, wherein:
    said metallic mass has a yield strength of less than 150 kg/cm$^2$.

12. A method as claimed in claim 1, 2, 3, 4, 5, 6, 7 or 8, wherein:
    said mass is made of material selected from the group consisting of bismuth, lead, tin, lead alloys, bismuth alloys and tin alloys.

13. A method as claimed in claim 1, 2, 3, 4, 5, 6, 7 or 8, wherein:
    said mass is made of material selected from the group consisting of bismuth, lead, tin, lead alloys, bismuth alloys and tin alloys, each having a yield strength of less than 150 kg/cm$^2$.

14. Apparatus for dampening vibrations of a transducer head structure, comprising in combination:
    a metallic mass in frictional engagement with said transducer head structure; and
    means coupled to said metallic mass for dampening vibrations of said transducer head structure by relative displacement between said mass and frictionally engaged transducer head structure.

15. Apparatus for dampening vibrations of a transducer head structure, comprising in combination:
a metallic mass; and
means including a viscoelastic polymeric layer for pressing said mass into frictional engagement with said transducer head structure to set up shearing strains in said layer with vibrations transmitted from said frictionally engaged transducer head structure through said mass to said layer to dampen vibrations of said transducer head structure by lagging oscillation in frictional engagement with said transducer head structure.

16. Apparatus as claimed in claim 15, wherein: said layer is an elastomer layer.

17. Apparatus as claimed in claim 15, wherein: said layer is bonded to said mass.

18. Apparatus for dampening vibrations of a transducer head structure, comprising in combination:
a metallic mass subject to plastic deformation in response to vibrations of said transducer head structure; and
means coupled to said metallic mass for effecting relative displacement between said mass and frictionally engaged transducer head structure and plastic deformation of said mass frictionally engaging said transducer head structure in response to said vibrations.

19. Apparatus for dampening vibrations of a transducer head structure, comprising in combination:
a metallic mass subject to plastic deformation in response to vibrations of said transducer head structure; and
means including a viscoelastic polymeric layer for pressing said mass into frictional engagement with said transducer head structure to set up shearing strains in said layer with vibrations transmitted from said frictionally engaged transducer head structure through said mass to said layer to dampen vibrations of said transducer head structure by lagging oscillation in frictional engagement with said transducer head structure and plastic deformation of said mass frictionally engaging said transducer head structure.

20. Apparatus as claimed in claim 19, wherein: said layer is an elastomer layer.

21. Apparatus as claimed in claim 19, wherein: said layer is bonded to said mass.

22. Apparatus as claimed in claim 14, 15, 16, 17, 18, 19, 20 or 21, wherein:
said metallic mass has a yield strength of less than 150 kg/cm$^2$.

23. Apparatus as claimed in claim 14, 15, 16, 17, 18, 19, 20 or 21, wherein:
said metallic mass had a density of at least 7 g/cm$^3$.

24. Apparatus as claimed in claim 23, wherein: said metallic mass has a yield strength of less than 150 kg/cm$^2$.

25. Apparatus as claimed in claim 14, 15, 16, 17, 18, 19, 20 or 21, wherein:
said mass is a mass of material selected from the group consisting of bismuth, lead, tin, lead alloys, bismuth alloys and tin alloys.

26. Apparatus as claimed in claim 14, 15, 16, 17, 18, 19, 20 or 21, wherein:
said mass is a mass of material selected from the group consisting of bismuth, lead, tin, lead alloys, bismuth alloys and tin alloys.

27. Apparatus as claimed in claim 15 or 19, wherein:
said pressing means include a housing structure for said transducer head structure, said housing structure including a plate section for pressing said layer toward said mass.

28. A method of dampening vibrations of a transducer head structure, comprising in combination the steps of:
providing a metallic mass;
providing said transducer head structure with a mounting beam;
frictionally engaging said mounting beam with said metallic mass; and
dampening vibrations of said transducer head structure by relative displacement between said mass and frictionally engaged mounting beam.

29. Apparatus for dampening vibrations of a transducer head structure, comprising in combination:
a mounting beam in said transducer head structure;
a metallic mass in frictional engagement with said mounting beam; and
means coupled to said metallic mass for dampening vibrations of said transducer head structure by relative displacement between said mass and frictionally engaged mounting beam.

* * * * *